United States Patent [19]

McGee et al.

US005543082A

[11] Patent Number: 5,543,082

[45] Date of Patent: * Aug. 6, 1996

[54] SILICONE FOAM CONTROL COMPOSITIONS

[75] Inventors: James B. McGee, Sanford; Lenin J. Petroff, Bay City; Doris J. Brecht, Sumner; William J. Ollinger, deceased, late of Sanford, Mich.; by John M. Ollinger, legal representative, St. Louis, Mo.

[73] Assignee: Dow Corning Corporation, Midland, Mich.

[*] Notice: The term of this patent shall not extend beyond the expiration date of Pat. No. 5,380,464.

[21] Appl. No.: 119,762

[22] Filed: Sep. 13, 1993

Related U.S. Application Data

[63] Continuation-in-part of Ser. No. 479,022, Feb. 12, 1990, Pat. No. 5,380,464, which is a continuation-in-part of Ser. No. 393,620, Aug. 14, 1989, abandoned, which is a continuation-in-part of Ser. No. 192,042, May 9, 1988, abandoned.

[51] Int. Cl.⁶ ........................................ B01D 19/04
[52] U.S. Cl. .............................. 252/321; 252/358
[58] Field of Search ............................ 252/321, 358

[56] References Cited

U.S. PATENT DOCUMENTS

| | | | |
|---|---|---|---|
| 2,807,601 | 9/1957 | Dennett | 260/42 |
| 2,985,545 | 5/1981 | Leavitt | 117/143 |
| 3,784,479 | 1/1974 | Keil | 252/358 |
| 3,900,617 | 8/1975 | Grenoble | 427/387 |
| 3,912,652 | 10/1975 | Colquhoun | 252/358 |
| 3,984,347 | 10/1976 | Keil | 252/321 |
| 4,076,648 | 2/1978 | Rosen | 252/358 |
| 4,190,688 | 2/1980 | Traver et al. | 427/391 |
| 4,293,671 | 10/1981 | Sasaki et al. | 525/478 |
| 4,395,352 | 7/1983 | Kulkarni et al. | 252/321 |
| 4,460,493 | 7/1984 | Lomas | 252/321 |
| 4,476,241 | 10/1984 | Dallavia, Jr. et al. | 502/156 |
| 4,559,396 | 12/1985 | Sasaki et al. | 528/15 |
| 4,562,096 | 12/1985 | Lo et al. | 427/208.8 |
| 4,587,136 | 5/1986 | White et al. | 427/54.1 |
| 4,609,574 | 9/1986 | Keryk et al. | 427/407.1 |
| 4,609,713 | 9/1987 | Terae et al. | 106/287.16 |
| 4,639,489 | 1/1987 | Aizawa et al. | 524/588 |
| 4,749,740 | 6/1988 | Aizawa et al. | 524/588 |
| 4,762,640 | 8/1988 | Schiefer | 252/321 |
| 4,978,471 | 12/1990 | Starch | 252/174.15 |
| 4,983,316 | 1/1991 | Starch | 252/174.15 |
| 5,283,004 | 2/1994 | Miura | 252/358 |
| 5,380,464 | 1/1995 | McGee et al. | 252/321 |

FOREIGN PATENT DOCUMENTS

| | | |
|---|---|---|
| 0217501 | 4/1987 | European Pat. Off. . |
| 0254499 | 1/1988 | European Pat. Off. . |
| 56-13910 | 7/1981 | Japan . |
| 61-167840 | 7/1986 | Japan . |

*Primary Examiner*—Richard D. Lovering
*Assistant Examiner*—Daniel S. Metzmaier
*Attorney, Agent, or Firm*—Timothy J. Troy

[57] ABSTRACT

There is disclosed a foam control composition comprising (I) a silicone defoamer reaction product and (II) a silicone glycol copolymer, which composition is particularly effective in defoaming highly acidic or highly basic aqueous systems. The compositions of the present invention can further comprise (III) a finely divided filler, and/or (IV) a trimethylsilyl or hydroxyl endblocked polyorganosiloxane.

38 Claims, No Drawings

SILICONE FOAM CONTROL COMPOSITIONS

This is a continuation-in-part of Ser. No. 07/479,022, filed on Feb. 12, 1990, now U.S. Pat. No. 5,380,464, which is a continuation-in-part of Ser. No. 07/393,620, filed on Aug. 14, 1989, now abandoned, which is a continuation-in-part of Ser. No. 07/192,042, filed on May 9, 1988, now abandoned.

BACKGROUND OF THE INVENTION

This invention relates to a foam control composition for use in aqueous foaming systems. More particularly, this invention relates to a composition consisting essentially of a silicone defoamer reaction product and a silicone glycol which is especially useful in controlling foam in highly acidic or highly basic systems operating at elevated temperatures. The present invention further relates to a composition consisting essentially of a silicone defoamer reaction product, a silicone glycol, and a low viscosity hydroxyl-endblocked polydiorganosiloxane.

The use of various silicone containing compositions as antifoams or defoamers is known. In this regard, it is well established that this art is highly unpredictable and slight modification can greatly alter performance of such compositions. Most of these compositions contain silicone fluid (usually dimethylpolysiloxane), often in combination with small amounts of silica filler. Additionally, these compositions may include various surfactants and dispersing agents in order to impart improved foam control or stability properties to the compositions.

Thus, for example, Rosen, in U.S. Pat. No. 4,076,648, teaches self-dispersible antifoam compositions consisting essentially of a lipophilic nonionic surface active agent homogeneously dispersed in a non-emulsified diorganopolysiloxane antifoam agent. This combination is said to promote dispersibility in water without the need for emulsification.

Kulkarni et al., in U.S. Pat. No. 4,395,352, improved upon the compositions disclosed by Rosen, cited supra, by limiting the viscosity of the dimethylpolysiloxane oil therein to the range of 5,000 to 30,000 cS at 25 C. Such a limitation, it is taught, unexpectedly resulted in improved efficiency in difficult-to-defoam aqueous systems, such as those which contain high concentrations of ionic surfactants and those which are very viscous.

Keil, in U.S. Pat. No. 3,784,479, discloses foam control compositions which consist essentially of a base oil selected from polyoxypropylene polymers, polyoxypropylene-polyoxyethylene copolymers or siloxane-glycol copolymers, a foam control agent, comprising a liquid dimethylpolysiloxane and silica filler, and a dispersing agent which consists of a copolymer of a siloxane resin and a polyoxyalkylene polymer. The contribution to the art in this case is stated to be improved compatibility with otherwise desirable diluents without resorting to emulsifying the foam control agent in water.

In a closely related patent, U.S. Pat. No. 3,984,347, Keil discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler and a siloxane copolymer dispersing agent. This time the dispersing agent consists of a copolymer of a dimethylpolysiloxane polymer and a polyoxyalkylene polymer. The same advantages as reported for U.S. Pat. No. 3,784,479, cited supra, were obtained.

A composition suitable for use as a defoamer in dyeing operations is taught by Colquhoun in U.S. Pat. No. 3,912,652. In this case, the composition consists of a copolymer of a dimethylpolysiloxane polymer and a polyoxyalkylene polymer combined with a lesser amount of a copolymer of a siloxane resin and a polyoxyalkylene polymer. Such compositions are stated to be particularly useful in jet dyeing operations since they are compatible with the dye carriers employed therein.

Japanese O.P.I. No. 139,107/81, published Oct. 30, 1981, teaches a self-emulsifying type defoaming agent which is said to have excellent foam-suppressing and breaking capability regardless of temperature and pH of a liquid to be treated and the storage period to which it is subjected. This agent is composed of a silicone copolymer having diorganosiloxane and organo-oxyalkylenesiloxane units in the copolymer chain.

A process for control of foaming in non-aqueous systems is disclosed by Lomas in U.S. Pat. No. 4,460,493. The compositions employed consist essentially of (1) at least one foam control agent, selected from polydimethylsiloxane or poly(methyl-3,3,3-trifluoropropyl)siloxane, which may optionally include a minor portion of a siloxane resin, (2) a dispersing agent of the type described in the patents to Keil, cited supra, and (3) a non-ionic surfactant having an HLB number greater than 10. This invention is said to provide an effective and cost efficient foam control method for the non-aqueous systems described. A similar composition containing a high molecular weight polydimethylsiloxane was also shown to be useful in defoaming highly acidic aqueous systems by Schiefer in U.S. Pat. No. 4,762,640.

Aizawa et al., in U.S. Pat. No. 4,639,489 and U.S. Pat. No. 4,749,740, the disclosures of which are hereby incorporated by reference, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed in Australian Patent Application No. 75771/87, published on Jan. 21, 1988 and assigned to Dow Corning KK, the disclosure of which is hereby incorporated by reference. In this disclosure, the abovementioned complex silicone mixture additionally contains at least 0.2 weight parts of an organic compound having at least one group selected from COR, —COOR' or —(OR")$_n$—, wherein R and R' are hydrogen or a monovalent hydrocarbon group, R" is a divalent hydrocarbon group having 2 to 6 carbon atoms and the average value of n is greater than one. In this disclosure the inventor, T. Miura, emphasizes the need to react all the ingredients, including a catalyst, at elevated temperature to obtain the desired antifoam agent.

John et al., in European Patent Application No. 217,501, published Apr. 8, 1987, the disclosure of which is hereby incorporated by reference, discloses a foam control composition which gives improved performance in high foaming detergent compositions which comprises (A) a liquid siloxane having a viscosity at 25° C. of at least $7 \times 10^{-3}$ m$^2$/s and which was obtained by mixing and heating a triorganosiloxane-endblocked polydiorganosiloxane, a polydiorganosiloxane having at least one terminal silanol group and an organosiloxane resin, comprising monovalent and tetravalent siloxy units and having at least one silanol group per molecule, and (B) a finely divided filler having its surface made hydrophobic. John et al. further describes a method for making the foam control compositions and detergent compositions containing said foam control compositions.

Starch, in U.S. Pat. No. 4,983,316 discloses a dispersible antifoam composition for providing controlled foaming liquid laundry detergent formulations and wherein there is provided a non-aqueous emulsion of primary and secondary silicone antifoam agents, at least one nonionic silicone surfactant for emulsifying the primary and secondary antifoaming agents in a solvent, a first organic surfactant dispersing agent for assisting in dispersing the emulsified primary and secondary antifoaming agents in the liquid laundry detergents, and a second dispersing agent of a nonionic difunctional block-copolymer terminating in primary hydroxyl groups for further assisting in dispersing the emulsified primary and secondary antifoam agents in the liquid laundry detergent. A liquid laundry detergent composition containing the composition described immediately above is also disclosed. Starch, in U.S. Pat. No. 4,978,471 discloses a composition which contains essentially the same components as in the '316 patent, however in the '471 patent the secondary antifoam agent is a blend of a polydimethylsiloxane substituted with polar groups and a polydimethylsiloxane fluid.

Terae et al., in U.S. Pat. No. 4,690,713, discloses an antifoam composition comprising (a) 100 parts by weight of a hydrocarbon oil, such as a spindle oil or silicone fluid (e.g. a polydimethylsiloxane fluid having a viscosity of 20 to 1,000,000 centistokes at 25° C., (b) 0.1 to 40 parts by weight of an organosilane compound having 1 to 3 hydroxy groups or hydrolyzable groups (such as alkoxy, acyloxy, and alkenyloxy groups), (c) 1 to 40 parts by weight of a finely divided silica powder and optionally a catalyst.

SUMMARY OF THE INVENTION

It has now been found that antifoam compositions disclosed by Aizawa et al., cited supra, can be advantageously utilized in acidic or basic aqueous foaming systems at elevated temperatures when these compositions are combined with particular silicone glycols. When the foam control compositions of the present invention are used, aqueous media having a pH as low as 1 or as high as 14 and a temperature as high as 150° C. are defoamed for longer time periods than when antifoams of the prior art are employed. This invention thus relates to a foam control composition consisting essentially of:

(I) a reaction product prepared by reacting at a temperature of 50° C. to 300° C.:
  (i) 100 parts by weight of at least one polyorganosiloxane selected from the group consisting of
    (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and
    (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one $-OR^3$ group in each molecule, at least one such $-OR^3$ group being present at the end of the molecular chain;
  (ii) 0.5 to 20 parts by weight of at least one resinous silicon compound selected from the group consisting of
    (a) an organosilicon compound of the general formula $R^4_d SiX_{4-d}$ in which $R^4$ is a monovalent hydrocarbon group having 1 to 5 carbon atoms, X is a hydrolyzable group and d has an average value of one or less,
    (b) a partially hydrolyzed condensate of said compound (a),
    (c) a siloxane resin consisting essentially of $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, and
    (d) a condensate of said compound (c) with said compound (a) or (b);
  (iii) zero parts by weight or from greater than zero to 30 parts by weight of a finely divided filler;
  (iv) a catalytic amount of a compound for promoting the reaction of components (i) to (iii); and
(II) from about 20 to 200 parts by weight for each 100 parts by weight of said silicone defoamer reaction product (I) of a silicone-glycol copolymer having the average general formula

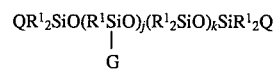

wherein $R^1$ has been previously defined, Q is $R^1$ or G, j has a value of 1 to 150, k has a value of 0 to 400 and G is a polyoxyalkylene group having the structure

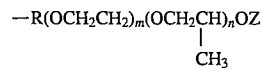

in which R is a divalent hydrocarbon group having 2 to 20 carbon atoms, m has an average value of about 4 to 50, n has an average value of 0 to about 50 and Z is selected from the group consisting of hydrogen, an alkyl radical having 1 to 6 carbon atoms and an acyl group having 2 to 6 carbon atoms, said silicone glycol being dispersible in water.

The present invention further relates to a composition further consisting essentially of (III) a finely divided filler, and/or (IV) a hydroxyl-endblocked polydiorganosiloxane polymer having the formula:

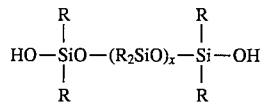

wherein R is a monovalent hydrocarbon radical having from 1 to 20 carbon atoms and x has a value from 5 to 100.

The present invention further relates to a process for controlling foam in an aqueous foaming system which includes the addition of a foam control agent to said system, the improvement comprising using the above described composition as the foam control agent.

It is therefore an object of the present invention to provide silicone foam control composition wherein there is provided improvement in the control of foaming behavior.

It is another object of the present invention to improve the the spreading rate of the antifoam compound of the silicone foam control composition.

It is a further object of the present invention to provide a silicone foam control composition which is characterized by ease of preparation and avoids the complex processing steps required by the teachings of the art.

These and other features, objects and advantages of the present invention will be apparent upon consideration of the following detailed description of the invention.

DETAILED DESCRIPTION OF THE INVENTION

The compositions of this invention consist essentially of reaction product (I) and from about 20 to 200 parts by weight of silicone glycol (II) for each 100 parts by weight of (I). The compositions of the present invention can further consist essentially of components (I) and (II) as stated above, and a low viscosity hydroxyl-endblocked polydiorganosiloxane.

Component (I) of the present invention can be a reaction product of (i) a polyorganosiloxane, (ii) a silicon compound, (iii) at least one finely divided filler, and (iv) a catalytic amount of a compound for promoting the reaction of the other components.

Component (i) may be selected from (A) polyorganosiloxanes comprising siloxane units of the general formula $R^1{}_a SiO_{(4-a)/2}$ and having a viscosity of 20 to 100,000 centistokes (cS) at 25° C. The organo groups $R^1$ of the polyorganosiloxane (A) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (A) is a trimethylsilyl-terminated polydimethylsiloxane having a viscosity of about 350 to 15,000 cS at 25 ° C.

Alternatively, component (i) may be selected from (B) polyorganosiloxanes comprising siloxane units of the general formula $R^2{}_b(R^3O)_c SiO_{(4-b-c)/2}$ and having a viscosity of 200 to 100 million centistokes at 25° C. wherein $R^2$ is independently selected from the monovalent hydrocarbon or halogenated hydrocarbon groups designated for group $R^1$, $R^3$ is a hydrogen atom or $R^2$, and the —$OR^3$ group is present at least at the end of a molecular chain of the polyorganosiloxane. The value of b is between 1.9 to 2.2 and c has a value so as to provide at least one —$OR^3$ group per molecule. It is particularly preferred that polyorganosiloxane (B) is a hydroxyl-terminated polydimethylsiloxane having a viscosity of about 1,000 to 50,000 cS at 25° C. Component (i) may also be a mixture of (A) and (B) in any proportion.

Component (ii) is at least one silicon compound selected from (a) to (d): (a) An organosilicon compound of the general formula $R^4{}_d SiX_{4-d}$ wherein $R^4$ is a monovalent hydrocarbon group having one to five carbon atoms, X is a hydrolyzable group, such as —$OR^5$ or —$OR^6OR^7$, in which $R^6$ is a divalent hydrocarbon group having one to five carbon atoms and $R^5$ and $R^7$ are each a monovalent hydrocarbon group having one to five carbon atoms, the average value of d not exceeding 1, (b) a partially hydrolyzed condensate of the compound (a), (c) a siloxane resin consisting essentially of $(CH_3)_3SiO_{1/2}$ and $SiO_2$ units and having a $(CH_3)_3SiO_{1/2}/SiO_2$ ratio of 0.4/1 to 1.2/1, and (d) a condensate of the siloxane resin (c) with the compound (a) or (b).

It is preferred that component (ii) is selected from either an alkyl polysilicate wherein the alkyl group has one to five carbon atoms, such as methyl polysilicate, ethyl polysilicate and propyl polysilicate, or the siloxane resin (c). Most preferably, component (ii) is either ethyl polysilicate or a siloxane resin copolymer consisting essentially of $(CH_3)_3SiO_{1/2}$ units and $SiO_2$ units in a molar ratio of approximately 0.4:1 to 1.2:1.

Component (iii) is optional and is a finely divided filler such as fumed $TiO_2$, $Al_2O_3$, $Al_2O_3/SiO_2$, $ZrO_2/SiO_2$ and $SiO_2$. Various grades of silica having a particle size of several millimicrons to several microns and a specific surface area of about 50 to 1000 $m^2/g$ are commercially available and suitable for use as component (iii). Preferably, the filler is selected from hydrophobic silicas having a surface area of about 50 to 300 $m^2/g$. Component (iii) can be 0 parts by weight in Reaction Product (I) or can be from greater than zero to 30 parts by weight per 100 parts by weight of Reaction Product (I).

Component (iv) is a compound used as a catalyst for promoting the reaction of the other components. It is preferably selected from siloxane equilibration and/or silanol-condensing catalysts such as alkali metal hydroxides, alkali metal silanolates, alkali metal alkoxides, quaternary ammonium hydroxides and silanolates, quaternary phosphonium hydroxides and silanolates and metal salts of organic acids. It is preferred that the catalyst is potassium silanolate.

For the purposes of the present invention, the reaction product (I) may optionally contain component (v), a polyorganosiloxane comprising siloxane units of the general formula $R^8{}_e(R^9O)_f SiO_{(4-e-f)/2}$ and having a viscosity of 5 to 200 cS at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value one is between 1.9 and 2.2 and f has a value so as to provide two or more —$OR^9$ groups in each molecule. It is particularly preferred that component (v) is a hydroxyl-terminated polydimethylsiloxane having a viscosity of about 10 to 50 cS at 25° C. It is preferred that component (v) is added when filler (iii) is a hydrophilic silica.

A mixture of components (i), (ii), and (iv), optionally containing components (iii) and/or (v), is reacted under heat to produce the reaction product (I), the proportions of the various components being:

Component (i)—100 parts by weight;

Component (ii)—0.5 to 20, preferably 1 to 7, parts by weight;

Component (iii)—0 parts by weight, or from greater than 0 to 30, preferably 1 to 15, and highly preferred is 5 to 15 parts by weight;

Component (iv)—A catalytic amount (usually in the range of 0.03 to 1 part by weight);

Component (v)—0 to 20, preferably 1 to 10, parts by weight. The proportions of components (A) and (B) used depends largely on their respective viscosities. It is preferable to use a mixture of (A) and (B) which has a viscosity of 1,000 to 100,000 cS at 25° C.

The reaction product (I) is prepared by first mixing components (i), (ii), and (iv) and heating this blend to about 110° to 120° C. Finely divided filler (iii), if desired, is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If component (v) is to be employed in the composition, it is generally added after the filler (iii). It is preferable to carry out all mixing and heating operations in an inert gas atmosphere in order to avoid any danger and to remove volatile matter (unreacted matter, by-products, etc.).

The mixing order of the components and the heating temperature and time as hereinabove stated are not believed critical, but can be changed as required. It is further preferred that, after reaction, the catalyst is neutralized to further stabilize reaction product (I).

Alternatively, reaction product (I) preferably comprises a diorganopolysiloxane and a =silicon compound, this combination optionally containing a filler such as silica, and a catalyst for promoting the reaction of these components. These systems contain a mixture of a trimethylsilyl-terminated polydimethylsiloxane and a diorganopolysiloxane having silicon-bonded hydroxyl groups or silicon-bonded alkoxy groups along its main chain or at its chain ends, said alkoxy groups having from 1 to 6 carbon atoms. The silicon compound (ii) acts as a crosslinker for the diorganopolysiloxane by reacting with the functionality of the latter. It is further preferred that the above diorganopolysiloxane is either a linear or a branched polymer or copolymer of siloxane units selected from dimethylsiloxane units, methylphenylsiloxane units or methyltrifluoropropylsiloxane units. Most preferably, the diorganopolysiloxane of component (A) is a polydimethylsiloxane containing Si-bonded hydroxyl or methoxy functionality. The above mentioned silicon compound (ii) is preferably a siloxane resin consisting essentially of $(CH_3)_3SiO_{1/2}$ and $SiO_2$ units and having a molar ratio of $(CH_3)_3SiO_{1/2}/SiO_2$ between 0.4:1 and 1.2:1. The latter resin may be prepared according to methods taught in, e.g., U.S. Pat. No. 2,676,182 to Daudt et al. and typically contains from about 0.5 to about 3 weight percent of hydroxyl groups.

A highly preferred component (I) is a homogeneous blend of a hydroxyl-terminated polydimethylsiloxane, a trimethylsilyl-terminated polydimethylsiloxane having a viscosity in the range of about 1,000 to 50,000 cS at 25° C., an alkyl polysilicate wherein the alkyl group has one to five carbon atoms, such as methyl polysilicate, ethyl polysilicate and propyl polysilicate, and a potassium silanolate catalyst reacted at a temperature of 50° to 300° C.

Component (II) of the present invention is a silicone glycol having the average general formula

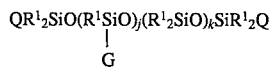

wherein $R^1$ has been previously defined, Q is $R^1$ or G, j has a value of 1 to 150, and k has a value of 0 to 400. In the above formula, G is a polyoxyalkylene group having the average structure

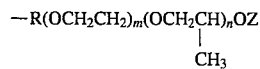

in which R is a divalent hydrocarbon group having 2 to 20 carbon atoms, m has a value of about 4 to 50 and Z is selected from the group consisting of hydrogen, an alkyl radical having 1 to 6 carbon atoms and an acyl group having 2 to 6 carbon atoms. For the purposes of the present invention, n is zero or has a value such as 1 to 50. Preferably, n has some small finite value in order to qualify the resulting foam control compositions for use in indirect food contact antifoam applications. Preferably, the value of m+n is from 2 to 100. The selection of the parameters j, k, m and n is made with the proviso that the silicone glycol (II) must be water dispersible (i.e., the silicone glycol does not phase separate on standing after being thoroughly mixed with water). Thus, for example, when the value of j is at least 10% of the value of k, the silicone glycol is generally dispersible in water. With this proviso in mind, it is preferred that both Q and $R^1$ of component (II) are methyl radicals and that R is the trimethylene group. It is further preferred that j is between 1 and 10, k is between 0 and 100 and m is between 7 and 12. Although somewhat inferior in performance, solid compositions of the present invention may be formed when m is sufficiently large (e.g., m=24).

It has been found that, in particular foaming systems, the above mentioned dispersibility may be improved by preferably employing two different silicone-glycol copolymers, as illustrated in Examples 27 to 29, infra. Additionally, component (II) can be a nonionic silicone surfactant. Preferably the nonionic silicone surfactant is a material including a trimethylsilyl endcapped polysilicate which has been condensed with a polyalkylene glycol or diester in a solvent, or a block copolymer of polydimethylsiloxane and polyalkylene oxide. These surfactants are well known in the art and are exemplified by the "dispersing agents" disclosed by Keil in U.S. Pat. Nos. 3,784,479 and 3,984,347, the disclosures of which are hereby incorporated by reference to teach said surfactants. In some instances the surfactants may best be processed from a solvent such as a polyalkylene glycol or copolymers thereof, cyclic silicones, or an organic solvent such as xylene. Component (II) can also be selected from organic dispersants such as alkylphenoxyethoxylates, ethoxylated alcohols, ethoxylated fatty acids, and glyceryl fatty acids.

The silicone glycols (II) are well known in the art, many of these being available commercially, and further description thereof is considered unnecessary.

The compositions of the present invention preferably also contain (III) a finely divided filler, as described above for component (iii). Addition of such a filler has been found to impart an increased measure of stability to the compositions since compositions consisting of only Components (I) and (II) tend to phase separate on standing at ambient conditions even though these compositions do provide enhanced antifoam performance. Specific examples of this filler include zirconium silica hydrogels (co-precipitated zirconium and silica) and hydrophobic precipitated silica, the latter being highly preferred.

The compositions of the present invention may further optionally contain (IV) a polyorganosiloxane of the type described for component (i), supra. Addition of this ingredient also confers added stability with respect to phase separation of components (I) and (II). Preferred polyorganosiloxanes in this regard are selected from the same trimethylsilyl-terminated polydimethylsiloxanes described for the preferred embodiments for (A) and the hydroxyl-terminated polydimethylsiloxanes for (B) of component (i), supra. For Component (IV), the preferred viscosity ranges of the polyorganosiloxanes of (A) and (B) are 2 to 100 cS and 5 to 100,000 cS, respectively. Particularly preferred viscosity ranges of these components are 10 to 50 cS for (A) and 10 to 100 cS for (B), the above viscosities being measured at 25° C.

It is highly preferred that Component (IV) of the present invention is a hydroxyl-endblocked polydiorganosiloxane polymer having the formula:

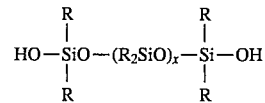

wherein R is a monovalent hydrocarbon radical or halohydrocarbon radical free of aliphatic unsaturation having from 1 to 20 carbon atoms and x has a value from 5 to 100.

The monovalent radicals of R in Component (IV) can contain up to 20 carbon atoms and include halohydrocarbon radicals free of aliphatic unsaturation and hydrocarbon radicals. Monovalent hydrocarbon radicals include alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl. Highly preferred monovalent hydrocarbon radical for the silicon-containing components of this invention are methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2-$ wherein the subscript n has a value of from 1 to 10, such as, for example, $CF_3CH_2CH_2-$ and $C_4F_9CH_2CH_2-$. The R radicals can be identical or different, as desired and preferably at least 50 percent of all R radicals are methyl.

In a preferred embodiment of the present invention, the polydiorganosiloxane polymer of Component (IV) is a hydroxyl-endblocked polydimethylsiloxane having the formula $HOMe_2SiO(Me_2SiO)_xSiMe_2OH$ wherein x has a value of from 10 to 60.

The polyorganosiloxanes of Component (IV) are well known in the silicone art and needs no detailed delineation herein. Suitable hydroxyl-endblocked polydiorganosiloxanes are disclosed for example, in U.S. Pat. Nos. 2,807,601,; 2,985,545; 3,900,617; 4,190,688; 4,293,671; 4,476,241; 4,559,396; 4,562,096; 4,587,136 and 4,609,574 which are incorporated herein by reference to further delineate hydroxyl end-blocked polydiorganosiloxanes and how to make them. It is preferable that about 10 to 100 parts by weight of hydoxyl-endblocked polydiorganosiloxane (IV) be used per 100 parts by weight of antifoam compound (I). It is highly preferred for purposes of the present invention that 30 to 70 parts by weight of hydroxyl-endblocked polydiorganosiloxane (IV) be used per 100 parts by weight of antifoam compound (I).

In addition to the above mentioned components, the foam control agents of the present invention may also contain adjuvants such as corrosion inhibitors and dyes.

The foam control agents of the present invention may be prepared by thoroughly mixing, without heating or further catalysis, 100 parts by weight of the reaction product (I) with 20 to 200 parts by weight, preferably about 100 parts, of the silicone glycol (II). Preferably, from 1 to 15 parts by weight of the finely divided filler (III) is also uniformly dispersed in the above mixture of components (I) and (II). This may be accomplished by any convenient mixing method known in the art such as a spatula, mechanical stirrers, in-line mixing systems containing baffles, blades, or any of the like mixing surfaces including powered in-line mixers or homogenizers, a drum roller, a three-roll mill, a sigma blade mixer, a bread dough mixer, and a two roll mill. Although the order of mixing is not considered critical, it is preferred to first mix components (I) and (II) and then disperse the finely divided filler (III) in this combination by using a high shear mixer. If the optional polyorganosiloxane (IV) is to be included in the composition, it is generally added at a level of about 10 to 100 parts by weight.

The present invention also relates to a process for controlling foam in an aqueous foaming system wherein the above-described foam control agents may simply be added to an acidic or basic aqueous foaming (or foam-producing) system. Typically, the foam control agents of the present invention are added at a concentration of about 0.001 to 0.1 percent based on the weight of the foaming system, however the skilled artisan will readily determine optimum concentrations after a few routine experiments. The method of addition is not critical, and the foam control agent may be metered in or added by any of the techniques known in the art. Examples of acidic foaming systems contemplated herein include media encountered in the production of phosphoric acid and in sulphite process pulping operations. Basic systems include bauxite digestion medium in the production of aluminum, inter alia. An example of a neutral system is a metal working fluid.

It has been found that the foam control agents of the present invention offer particular advantage when the foaming system comprises highly acid or highly basic aqueous environments, such as those having a pH of less than about 3 or greater than about 12. This holds particularly for highly acidic or basic systems at elevated temperatures. Thus, for example, under the extremely harsh conditions encountered in paper pulp manufacture, wherein the aqueous foaming medium (kraft process "black liquor") has a pH of 12 to 14 and a temperature of 50° C. to 100° C., the compositions of the present invention have been found to provide defoaming activity for considerably greater time periods than antifoam agents of the prior art (e.g., those disclosed by Kulkarni et al. or those of Aizawa et al., both cited supra).

The compositions of the present invention can be used as any kind of foam control agents, i.e. as defoaming agents and/or antifoaming agents. Defoaming agents are generally considered as foam reducers whereas antifoaming agents are generally considered as foam preventors. The compositions of the present invention find utility as foam control compositions in various media such as inks, coatings, paints, detergents, black liquor, and pulp and paper manufacture.

EXAMPLES

The following examples are presented to further illustrate the compositions of this invention, but are not to be construed as limiting the invention, which is delineated in the appended claims. All parts and percentages in the examples are on a weight basis unless indicated to the contrary.

The following materials were employed in the preparation of the antifoam compositions:

FLUID A

A reaction product was prepared according to Example 1 of U.S. Pat. No. 4,639,489 to Aizawa et al., cited supra. This antifoam contained 60 parts of a trimethylsilyl-terminated polydimethylsiloxane having a viscosity of 1,000 cS at 25° C.; 29 parts of a hydroxyl-terminated polydimethylsiloxane having a viscosity of 12,500 cs at 25° C.; 2.9 parts of ethyl polysilicate ("Silicate 45" of Tama Kagaku Kogyo Co., Ltd., Japan); 4.8 parts of a potassium silanolate catalyst; 2.9 parts of Aerogel #200 silica (Nippon Aerogel Co., Japan) having a surface area of 200 $m^2/g$; and 4.8 parts of hydroxyl-terminated polydimethylsiloxane having a viscosity of 40 cS at 25° C. In addition to the above ingredients, this formulation also included 0.3 parts of ethanol as part of the catalyst, 0.1 part water adsorbed on the silica and 0.1 part of L-540, added as a process dispersant. L-540 (Union Carbide Corp., Danbury, Conn.) is described as a silicone glycol block copolymer wherein the glycol blocks consist of 50/50 mole percent of polyoxyethylene/polyoxypropylene.

FLUIDS B to K

Silicone glycols having the average structure

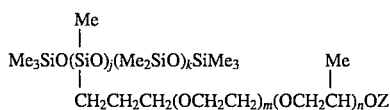

$$Me_3SiO(SiO)_j(Me_2SiO)_kSiMe_3$$
with side group $CH_2CH_2CH_2(OCH_2CH_2)_m(OCH_2CH)_nOZ$ and Me on the branched Si wherein Me hereinafter denotes a methyl radical and Z, j, k, m, and n are defined in the following table:

| Ingredient | HLB Value | Z | j | k | m | n |
|---|---|---|---|---|---|---|
| FLUID B | 14 | —H | 1 | 0 | 12 | 0 |
| FLUID C | 7 | —C(O)Me | 1 | 24 | 12 | 0 |
| FLUID D | — | —H | 1 | 0 | 7 | 0 |
| FLUID E | — | —H | 1 | 0 | 24 | 0 |
| FLUID F | — | —H | 4 | 13 | 7 | 0 |
| FLUID G | — | —H | 4 | 13 | 12 | 0 |
| FLUID H | — | -Me | 9.5 | 330.5 | 16 | 22 |
| FLUID I | — | -Me | 7.5 | 332.5 | 16 | 22 |
| FLUID J | — | —H | 9.5 | 103 | 18 | 18 |
| FLUID K | — | —H | 2 | 22 | 11.88 | 0.12 |

QUSO WR55

A hydrophobic precipitated silica having a surface area of 120 square meters per gram obtained from Degussa—Pigments Division, Teterboro, N.J.

Test Method

A defoaming tester similar to that described in U.S. Pat. No. 3,107,519, hereby incorporated by reference, was used to evaluate the antifoaming efficiency of the compositions of the present invention. In brief, this apparatus was designed to recirculate a foaming liquid from the bottom discharge of a partially filled graduated cylinder, through a magnetically-coupled pump and an in-line aspirator, to the top portion of the graduated cylinder, wherein, the circulating liquid was caused to splash onto the free surface of the liquid contained in the cylinder. The temperature of the whole system was controlled at 77° C.

The foaming liquid employed in conjunction with the above apparatus was a "kraft process black liquor" obtained from a wood pulp digestion step in the manufacture of paper. This liquor consisted essentially of sodium lignin sulfonate, pentosan sugars, tall oil soaps, sodium carbonate, sodium sulfide and sodium hydroxide dispersed in water. The liquor had a solids content of about 15% and a pH of 13.5 at 20° C.

In practice, the apparatus was flushed with heated tap water until its temperature had equilibrated at 77±0.1° C., whereupon the system was drained. The cylinder was then filled to a level of 14 cm (400 ml) with the above described foaming liquid which had been preheated to 77° C. When the pump was activated, the liquid level in the cylinder dropped to approximately 11 cm in the cylinder as the foaming liquid filled the pump and lines. Air entrained in the foaming fluid from passing through the aspirator, in addition to the above mentioned splashing action, produced copious foam above the surface of the liquid in the cylinder.

When the total foam height reached a height of 21 cm (i.e., 10 cm of actual foam and 11 cm of liquid), an antifoam composition, in water dispersion form, was injected into the foaming liquid through a rubber tube at the base of the graduated cylinder. Foam height was recorded as a function of time and the "knockdown" and "persistence" characteristics were noted. The knockdown value, which represents the initial rapid reduction of foam height when the antifoam composition was injected into the foaming liquid, is defined herein as the total foam height at a time of ten seconds after injection. The persistence value, which relates to the antifoam's ability to suppress foaming for a given period of time after injection of the antifoam composition, is defined herein as the time at which the total foam height increased beyond its initial height of 21 cm and maintained a height of greater than 21 cm for more than 2 minutes.

EXAMPLES 1–3

Antifoam compositions of the present invention were prepared by mixing the components indicated in Table 1 in a ½ ounce vial, wherein a microspatula was used to stir the mixture till a homogeneous dispersion was obtained.

TABLE 1

| Component | Example 1 | Example 2 | Example 3 |
|---|---|---|---|
| Grams of FLUID A | 3.7 | 4.0 | 3.7 |
| Grams of FLUID B | 4.0 | 4.0 | — |
| Grams of FLUID C | — | — | 4.0 |
| Grams of QUSO WR55 | 0.3 | — | 0.3 |

(Comparative) EXAMPLE 4

FLUID A was dispersed in deionized water according to the formulation recommended by Aizawa et al. at column 8 of U.S. Pat. No. 4,639,489, cited supra:

| | |
|---|---|
| FLUID A (Polyoxyethylene Monostearate) | 10.0 parts |
| Fatty Acid Ester of Glycerine (PLURONIC L101, BASF, Parsippany, NJ) (MAZOL GMS K, Mazer Chem. Inc., Gurnee, IL) | 1.4 |
| Hydroxylated Cellulose (NATROSOL 250LR, Hercules, Inc., Wilmington, DE) | 1.2 1.5 |
| Antiseptic Agent (Benzoic Acid) | 0.1 |
| Water | Balance |
| | Total 100 Parts |

This composition was prepared by first dispersing the NATROSOL 250LR, MAZOL GMS K and PLURONIC L101 in 38.5 parts of water heated to 70° C. using an Eppenbach mixer. FLUID A was then added and mixed for 30 minutes at 70° C., whereupon the mixture was cooled to 50° C. This combination was further mixed for 30 minutes at 50° C. and the remaining water (47.3 parts) was added. The benzoic acid was finally added and the total antifoam composition cooled under shear to 30° C.

(Comparative) EXAMPLE 5

An antifoam composition was prepared in a ½ ounce vial using a microspatula to mix the ingredients which consisted of 4.0 grams of FLUID C, 0.3 gram of QUSO WR55 and 3.7 grams of a trimethylsilyl-endblocked polydimethylsiloxane having a viscosity of 20,000 cS at 25° C.

(Comparative) EXAMPLE 6

The procedures of (Comparative) Example 5 were repeated wherein FLUID B was substituted for FLUID C.

Each of the antifoam compositions of Examples 1–6 was diluted with deionized water to form a dispersion having a solids content of approximately 1%, the term "solids" as used herein referring to all silicones, silica and dispersants in a given antifoam composition. This dilution allowed an accurate amount of the antifoam to be introduced into the graduated cylinder by employing a disposable syringe, which amount was adjusted so as to provide an antifoam solids content of 25 ppm (parts per million) in the foaming liquid. Knockdown and persistence results are presented in Table 2.

TABLE 2

| Example | Knockdown Value (Centimeters) | Persistence Value (Seconds) |
|---|---|---|
| 1 | 13.5 | 1440 |
| 2 | 15.5 | 1620 |
| 3 | 13.5 | 1140 |
| (Comparative) Example | | |
| 4 | 15.0 | 480 |
| 5 | 22.0 | 0 |
| 6 | 20.0 | 30 |

It can be seen from Table 2 that the compositions of the present invention produced knockdown values at least as good as the comparison antifoams while providing much improved persistence values. Although Example 2 exhibited the best persistence value, this formulation was less desirable than Examples 1 and 3 since it separated into two phases upon standing at room temperature for less than five minutes whereas the latter materials were stable.

EXAMPLES 7–9

Compositions of the present invention, which additionally contained trimethylsilyl-endblocked polydimethylsiloxane having the viscosities (at 25° C.) indicated in Table 3, were prepared in the manner described above for Examples 1–3. These compositions were again diluted in deionized water and tested as above, the results also being shown in Table 3.

TABLE 3

| Component | Example 7 | Example 8 | Example 9 |
|---|---|---|---|
| Grams of FLUID A | 4.0 | 4.0 | 4.0 |
| Grams of FLUID B | 4.0 | 4.0 | 4.0 |
| Grams of QUSO WR55 | 0.15 | 0.15 | 0.15 |
| Grams 10 cS Polydimethylsiloxane | 0.925 | 1.85 | — |
| Grams 1,000 cS Polydimethylsiloxane | 0.925 | — | 1.85 |
| Knockdown Value (Centimeters) | 15.0 | 15.0 | 13.5 |
| Persistence Value (Seconds) | 720 | 840 | 840 |

Each of these compositions was stable at room temperature and did not phase-separate.

(Comparative) EXAMPLES 10–12

In order to further illustrate the advantage of the compositions of the present invention, the reaction product was combined with two organic glycols (AE 501 and POLYGLYCOL P2000) and a nonionic surfactant (TRITON X-100), as indicated in Table 4. AE 501 (Dow Chemical Co., Midland, Mich.) is described as a glycol having the average formula $CH_2=CHCH_2(OCH_2CH_2)_{12}OH$. POLYGLYCOL P2000 (Dow Chemical Co., Midland, Mich.) is described as a polypropylene glycol having a molecular weight of about 2,000. TRITON X-100 (Rohm and Haas, Philadelphia, Pa.) is described as octylphenoxypolyethoxy(10)ethanol having an HLB value of 13.5. These compositions also contained trimethylsilyl-endblocked polydimethylsiloxane having the viscosities (at 25° C.) indicated in Table 4. They were prepared and tested in the manner described above for Examples 7–9, the test results being presented in Table 4, wherein Example 7 is again included to highlight the advantages of the compositions of the present invention.

TABLE 4

| | Example | (Comparative) Example | | |
|---|---|---|---|---|
| Component | 7 | 10 | 11 | 12 |
| Grams of FLUID A | 4.0 | 4.0 | 4.0 | 4.0 |
| Grams of FLUID B | 4.0 | — | — | — |
| Grams of AE 501 | — | 4.0 | — | — |
| Grams of POLYGLYCOL P2000 | — | — | 4.0 | — |
| Grams of TRITON X-100 | — | — | — | 4.0 |
| Grams of QUSO WR55 | 0.15 | 0.15 | 0.15 | 0.15 |
| Grams 10 cS Polydimethylsiloxane | 0.925 | 0.925 | 0.925 | 0.925 |
| Grams 1,000 cS Polydimethylsiloxane | 0.925 | 0.925 | 0.925 | 0.925 |
| Knockdown Value (Centimeters) | 15.0 | * | * | 16.0 |
| Persistence Value (Seconds) | 720 | * | * | 120 |

*Could not be metered in accurately due to poor dispersion.

EXAMPLES 13–17

A master batch composition was prepared by mixing the following previously described ingredients for one hour using a low shear air stirrer:

| | |
|---|---|
| QUSO WR55 | 10.0 Parts |
| 10 cS Polydimethylsiloxane | 63.3 |
| 1000 cS Polydimethylsiloxane | 63.3 |
| FLUID A | 63.3 |

This master batch was then mixed with an equal weight of each of the silicone glycols appearing in Table 5 and tested as before.

TABLE 5

| Example | Silicone Glycol Used | Knockdown Value (cm) | Persistence Value (sec.) |
|---|---|---|---|
| 13 | FLUID D | 17.5 | 60 |
| 14 | FLUID E | 18.5 | 30 |
| 15 | FLUID F | 17.5 | 60 |
| 16 | FLUID G | 18.0 | 30 |
| 17 | FLUID B | 16.0 | 120 |

It was observed that the composition of Example 14 was a solid at room temperature indicating that the antifoams of the present invention can be produced in solid form when the number of ethylene oxide units in the silicone glycol is sufficiently high.

EXAMPLES 18–22

A "thickened water" composition was prepared by mixing the following ingredients:

| Ingredient | Parts |
| --- | --- |
| METHOCEL F4M (Dow Chemical, Midland, MI) | 1.50 |
| Benzoic Acid (Preservative) | 0.10 |
| Sorbic Acid (Preservative) | 0.10 |
| Deionized Water | Balance |
| Total = | 100 Parts |

The "thickened water" was used to prepare antifoam emulsions by heating to 65°–70° C., adding the antifoam ingredients shown in Table 6 and mixing for 15 minutes. These mixtures were cooled to less than 30° C. and homogenized in a SONOLATOR (Sonic Corporation, Stratford, Conn.) at 4.00 psi.

TABLE 6

| | Example | (Comparative) Examples | | | |
| --- | --- | --- | --- | --- | --- |
| Parts | 18 | 19 | 20 | 21 | 22 |
| PDMS - 10 cS[(1)] | 2.775 | — | 3.08 | — | — |
| PDMS - 1000 cS[(2)] | 2.775 | — | 3.08 | — | — |
| FLUID A | 3.000 | 10 | 3.34 | — | — |
| QUSO WR55 | 0.450 | — | 0.50 | — | — |
| FLUID D | 10 | — | — | 10 | — |
| Water | — | — | — | 90 | — |
| "Thickened Water" from above | 81 | 90 | 90 | — | — |
| SAG Mark X[(3)] | — | — | — | — | 100 |

[(1)]Trimethylsilyl terminated polydimethylsiloxane having a viscosity of 10 cS at 25° C.
[(2)]Trimethylsilyl terminated polydimethylsiloxane having a viscosity of 1000 cS at 25° C.
[(3)]A silicone antifoam produced under U.S. Pat. No. 4,395,352 and marketed by Union Carbide Corporation, Danbury, CT (stated silicone content = 10%).

Testing of the above antifoam compositions was conducted using a kraft process black liquor as described in the previous examples. The antifoam content used (and shown in Table 7) was calculated based on total silicone and silica solids and does not reflect the amounts of thickener and preservatives.

From Table 7 it can be seen that (Comparative Example 21), which contained silicone glycol but no FLUID A, showed essentially no activity since the minimum foam height was 21 cm (i.e., identical to the value when antifoam was injected) and the persistence value was zero. Similarly, (Comparative) Examples 19 and 20, which contained FLUID A but no silicone glycol, showed poor knockdown and persistence values. When both FLUID A and silicone glycol were combined (Example 18), a synergistic antifoaming activity was observed.

EXAMPLES 23–25

A pump test similar to that described above was used to evaluate two compositions of the present invention as antifoaming agent for an aqueous blue flexographic ink. In this evaluation, the circulating fluid containing antifoam was continuously sheared within a cup situated above the graduated cylinder by means of a high shear mixer run at 6000 r.p.m., the overflow from the cup being directed into the cylinder. Before testing, the ink was diluted with water in the ratio of 90 parts ink/10 parts water and 0.4% of the antifoam agents described in Table 8, below, were added. Testing was carried[ out at a fluid temperature of 30° C. and a fluid circulation rate of 1 liter/min. Foam volume in the graduated cylinder was observed as a function of time, the results being also presented in Table 8.

TABLE 8

| | Example 23 | Example 24 | Example 25 |
| --- | --- | --- | --- |
| | Composition | | |
| Parts FLUID A | 50 | 50 | 47.5 |
| Parts FLUID C | — | — | 47.5 |
| Parts FLUID H | 50 | — | — |
| Parts FLUID I | — | 50 | — |
| Parts QUSO WR55 | — | — | 5.0 |
| | Test Results | | |
| Foam Volume (ml) After: | | | |
| 10 Minutes | 80 | 100 | 105 |
| 30 Minutes | 88 | 145 | 125 |
| 60 Minutes | 76 | 155 | 138 |
| 90 Minutes | 70 | 155 | 145 |

EXAMPLE 26

The following foam control composition was prepared and tested with the kraft process black liquor, according to

TABLE 7

| | | TIME IN SECONDS | | | |
| --- | --- | --- | --- | --- | --- |
| | Antifoam Conc. (ppm) | Minimum Foam Ht (cm) | Time to 21 cm | Time to 26 cm | Time to 31 cm | Time to >32 cm |
| Ex. | | | | | | |
| 18 | 190 | 15.5 | 480 | 900 | 1500 | 1500 |
| 18a | 85 | 16.5 | 210 | 300 | 600 | 720 |
| (Comparative) Examples | | | | | | |
| 19 | 100 | 21 | 0 | 10 | >1800 | >1800 |
| 20 | 100 | 21 | 0 | 90 | 900 | 900 |
| 21 | 100 | 21 | 0 | 10 | 30 | 60 |
| 22 | 100 | 14.5 | 210 | 270 | 480 | 540 | the methods described in Examples 1–9, above.

| | Grams |
|---|---|
| PDMS - 20 cS (1) | 0.925 |
| PDMS - 1000 cS (2) | 0.925 |
| FLUID A | 4.00 |
| FLUID B | 4.00 |
| QUSO WR55 | 1.50 |

(1) Trimethylsilyl terminated polydimethylsiloxane having a viscosity of 20 cS at 25° C.
(2) Trimethylsilyl terminated polydimethylsiloxane having a viscosity of 1000 cS at 25° C.

Antifoam concentration was again calculated based on total silicone and silica solids.. In this series of experiments, SAG Mark X (Union Carbide Corporation, Danbury, Conn.) was tested alongside the above composition for comparison, the results being presented in Table 9.

TABLE 9

| Antifoam Agent | Antifoam Conc. (ppm) | Knockdown Value (cm) | Persistence Value (seconds) |
|---|---|---|---|
| Example 26 | 25 | 15.5 | 720 |
| " | 19 | 16.0 | 300 |
| " | 12 | 16.5 | 120 |
| SAG Mark X | 125 | 15.0 | 60 |
| " | 50 | 16.5 | 30 |
| " | 25 | 17.5 | 30 |

From the results of table 9, it is seen that significantly lower antifoam concentrations of the present invention provide superior performance relative to a similar commercial product prepared according to U.S. Pat. No. 4,395,352.

EXAMPLES 27–29

Foam control compositions of the following formulations were prepared.

| | Example 27 | Example 28 | Example 29 |
|---|---|---|---|
| METHOCEL E4M | 15 grams | 15 grams | 15 grams |
| FLUID J | 0 | 10 | 20 |
| FLUID A | 47.5 | 42.75 | 38 |
| FLUID K | 47.5 | 42.75 | 38 |
| QUSO WR55 | 5 | 4.5 | 4 |
| Biocide | 1 | 1 | 1 |
| Deionized water | 884 | 884 | 884 |

The deionized water was heated to 70° C. and METHOCEL E4M (Dow Chemical Co., Midland, Mich.) was slowly added thereto while mixing to obtain a uniform dispersion. FLUID J was then added to this dispersion and thoroughly mixed therewith. To this combination, there was added a uniform mixture of FLUID A, FLUID K and QUSO WR55 according to the above table, and again thoroughly mixed therewith. Stirring was continued till the mixture had cooled to whereupon the biocide (KATHON LX, Rohm & Haas, Philadelphia, Pa.) was added. Stirring was continued till the mixture had cooled to 30° C.

The above foam control compositions were tested according to the methods described in Examples 1–9 using two different kraft black liquors having a non-volatile content of 7.5% and 22%, respectively. The foam control compositions were used at a concentration of 25 ppm (based on total silicone and silica solids), the test results being shown in Table 10. In addition to presenting the minimum foam height (i.e., Knockdown Value) and the time to reach 21 cm (i.e., Persistence Value), Table 10 shows the time to reach a total height (foam plus liquid) of 32 cm.

TABLE 10

| Antifoam Agent | Knockdown Value (cm) | Persistence Value (seconds) | Time to 32 cm (seconds) |
|---|---|---|---|
| Example 27 | | | |
| (7.5% liquor) | 12 | 210 | 720 |
| (22% liquor) | 15 | 90 | 420 |
| Example 28 | | | |
| (7.5% liquor) | 11 | 660 | >1800 |
| (22% liquor) | 15 | 150 | 480 |
| Example 29 (22% liquor) | 14.5 | 180 | >1800 |

EXAMPLES 30–33

The following series of experiments was conducted to compare the antifoam compositions of the instant invention with those patented by Starch in U.S. Pat. No. 4,978,471 and U.S. Pat. No. 4,983,316.

An antifoam composition (Comparative Example 30) was prepared according to Example II of the Starch patents which consisted of

| 80 grams | FLUID A |
|---|---|
| 40 g | polydimethylsiloxane (1,000 cS) |
| 18 g | FLUID K |
| 6 g | TRITON ™ X-100 |
| 40 g | PLURONIC ™ L-101 |
| 216 g | polypropylene glycol (molecular weight of 2,000) |

FLUID K had the average structure

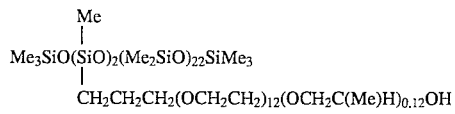

wherein Me hereinafter denotes a methyl radical.

In a similar manner, the following antifoam compositions, according to the teachings of the present invention were also prepared:

| Component | Example 31 | Example 32 | Example 33 |
|---|---|---|---|
| FLUID A | 300 g | 200 g | 47.5 g |
| FLUID K | 45 | 45 | 47.5 |
| Polydimethylsiloxane (1,000 cS) | — | 100 | — |
| WR 55 silica | — | — | 5.0 |

Forty grams of each of the antifoam compositions of Examples 30–33 were dispersed in 360 g of water containing 1 weight percent of xantham gum and 0.4 g of a 1.5% biocide solution (KATHON™ LX; Rohm and Haas). This resulted in emulsions having an antifoam solids content of 10% by weight. These emulsions, in turn, were further diluted with water (45 g of water to 5 g of emulsion) prior to evaluation by the pump test procedure described hereinabove. An actual hardwood black liquor was obtained from a pulp mill and used throughout the pump testing reported herein. In each case, the amount of the diluted emulsion injected was adjusted so as to provide an antifoam solids concentration of 10 parts per million (ppm) by weight of the black liquor composition.

The results obtained are presented in Table 11, wherein foam height is recorded as a function of time after injection of the antifoam and a control containing no antifoam is included for reference.

TABLE 11

| Example | Foam Height (cm) | | | | | |
|---|---|---|---|---|---|---|
| | 10 seconds | 1 minute | 5 min | 10 min | 15 min | 20 min |
| 30 (comparative) | 21 | 16 | 22 | 25 | 30 | 30 |
| 31 | 18.5 | 14.5 | 19.5 | 25.5 | 26 | 31 |
| 32 | 18.5 | 15.5 | 19.5 | 26.5 | 30 | 32 |
| 33 | 12 | 16 | 18 | 24 | 28.5 | 30 |
| Control (no antifoam) | 22 | 27 | 32 | >32* | >32* | >32* |

*foam height was beyond the capacity of the test cylinder.

Table 11 shows similar defoaming activity for each of the antifoam compositions of Examples 30 through 33 at relatively long times after injection (i.e., their "persistence" values are similar). However, the activity at 10 seconds (i.e., the "knockdown" value) of Comparative Example 30 is very close to the control while the corresponding activities of Examples 31 through 33 are significantly improved over the control. Such an immediate reduction in foam height (i.e., knockdown) is a critical characteristic of an antifoam composition to be used in pulp mill liquor processing operations.

EXAMPLES 34–38

The following series of experiments was conducted to compare the antifoam compositions of the instant invention with those patented by Kulkarni et al. in U.S. Pat. No. 4,395,352.

An antifoam composition (Comparative Example 34) was prepared according to Preparative Example 1 of the Kulkarni patent which consisted of

| 291 g | polydimethylsiloxane (10,000 cS) |
|---|---|
| 33.3 g | FLUID K (HLB = 7) |
| 9 g | WR 55 silica |

Additionally, an antifoam composition (Comparative Example 35) was prepared according to the teachings of Kulkarni which represents the extreme ratio (high end) of silicone glycol to polydimethylsiloxane fluid (i.e., 20:100, respectively). This example consisted of

| 300 g | polydimethylsiloxane (10,000 cS) |
|---|---|
| 60 g | FLUID K (HLB = 7) |
| 12 g | WR 55 silica |

The following antifoam compositions were also prepared:

| Component | Comparative Example 36 | Example 37 | Example 38 |
|---|---|---|---|
| FLUID A | 300 g | 150 g | 300 g |
| FLUID K | — | 60 | 60 |
| Polydimethylsiloxane (10,000 cS) | — | 150 | — |
| WR 55 silica | 12 | 12 | 12 |

The antifoam compositions of Examples 34 through 38 were evaluated by the pump test as described above and the results are reported in Table 12. A control black liquor containing no antifoam was again included as a reference in this experimental series.

Table 12, below, shows similar defoaming activity for each of the Kulkarni et al. compositions (Comparative Examples 34 and 35) wherein the long time defoaming performance (related to "persistence") is relatively poor and essentially the same as the control. The use of a defoamer according to Aizawa et al. (Comparative Example 36) produced, a significant improvement in both the short and the long time defoaming character while the compositions according to the instant invention (Examples 37 and 38) provided yet another significant incremental improvement in performance over the composition of Aizawa et al., particularly in the short time range.

TABLE 12

| Example | Foam Height (cm) | | | | | |
|---|---|---|---|---|---|---|
| | 10 seconds | 1 minute | 5 min | 10 min | 15 min | 20 min |
| 34 (comparative) | 20 | 23 | >32* | >32* | >32* | >32* |
| 35 (comparative) | 19 | 20.5 | 32 | >32* | >32* | >32* |
| 36 (comparative) | 14 | 17 | 23 | 24.5 | 32 | >32* |
| 37 | 11.5 | 15 | 19 | 26 | 30 | 31 |
| 38 | 11.5 | 13.5 | 17.5 | 18 | 19 | 21 |
| Control (no antifoam) | 22 | 28 | >32* | >32* | >32* | >32* |

*foam height was beyond the capacity of the test cylinder.

EXAMPLES 39–47

The following series of experiments was conducted to compare the antifoam compositions of the instant invention with those patented by Aizawa et al. in U.S. Pat. No. 4,639,489 and with silicone glycol copolymers.

Several antifoam compositions were prepared, The samples prepared were as follows:

Comparative Example 39 was Fluid A as described hereinabove,

Comparative Example 40 was Fluid J as described hereinabove,

Comparative Example 41 was a silicone glycol copolymer having the average structure:

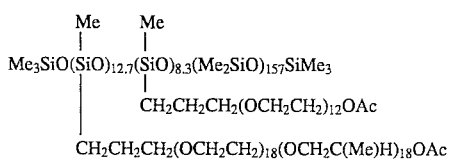

wherein Ac is an acetoxy group,

Comparative Example 42 was a silicone glycol copolymer having the average structure:

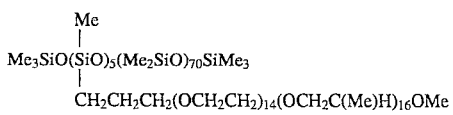

Comparative Example 43 was a silicone glycol copolymer having the average structure:

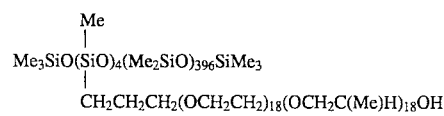

Example 44 was a mixture of 45 weight percent of Example 39 and 55 weight percent of Example 40.

Example 45 was a mixture of 45 weight percent of Example 39 and 55 weight percent of Example 41.

Example 46 was a mixture of 45 weight percent of Example 39 and 55 weight percent of Example 42.

Example 47 was a mixture of 45 weight percent of Example 39 and 55 weight percent of Example 43.

Sixty grams of each of the antifoam compositions of Examples 39 through 47 were dispersed in 340 g of water containing 1 weight percent of xantham gum and 0.4 g of a 1.5% biocide solution (KATHON™ LX; Rohm and Haas). This resulted in emulsions having an antifoam solids content of 15% by weight. These emulsions, in turn, were further diluted with water (45 g of water to 5 g of emulsion) prior to evaluation by the pump test procedure described hereinabove. An actual softwood black liquor (at 10% solids) was obtained from a pulp mill and used throughout the pump testing reported herein. In each case, the amount of the diluted emulsion injected was adjusted so as to provide an antifoam solids concentration of 10 parts per million (ppm) by weight of the black liquor composition. The results obtained are presented in Table 13, wherein foam height is recorded as a function of time after injection of the antifoam and two controls containing no antifoam are included for reference.

TABLE 13

| | Foam Height (cm) | | | | | |
|---|---|---|---|---|---|---|
| | 10 seconds | 1 minute | 5 min | 10 min | 15 min | 20 min |
| Comparative Examples | | | | | | |
| 39 | 24.5 | 23 | 27 | 25.5 | 29 | 32 |
| 40 | 22.5 | 26 | 32+ | | | |
| 41 | 23 | 30.5 | 32+ | | | |
| 42 | 26 | 32 | 32+ | | | |
| 43 | * | | | | | |

TABLE 13-continued

| | Foam Height (cm) | | | | | |
|---|---|---|---|---|---|---|
| | 10 seconds | 1 minute | 5 min | 10 min | 15 min | 20 min |
| Examples | | | | | | |
| 44 | 16 | 15.5 | 16.5 | 18 | 19 | 19 |
| 45 | 15 | 16.5 | 21 | 21.5 | 21 | 27.5 |
| 46 | 14 | 16.5 | 18.5 | 19 | 16.5 | 18.5 |
| 47 | * | | | | | |
| Control 1 (no antifoam) | 23 | 30.5 | 32+ | | | |
| Control 2 (no antifoam) | 22.5 | 25.5 | 32+ | | | |

*sample did not form a stable emulsion which could be accurately tested.

Table 13 shows that the defoaming activity for the antifoam compositions of the present invention (Examples 44, 45, and 46) was maintained for much longer times after injection (i.e. the "persistence" value) than silicone glycol copolymers alone and also displayed greater short time and long time defoaming performance than the composition of Aizawa et al.. The advantages of the present invention over the Aizawa composition and the silicone glycol copolymer compositions are clearly displayed by the activity at 10 seconds (i.e. the "knockdown" value). The knockdown value of Comparative Example 39 (Aizawa et al.), and Comparative Examples 40, 41, and 42 (silicone glycol copolymer compositions) were relatively poor and were very close to the control in contrast to the compositions of the present invention (Examples 44, 45, and 46) which unexpectedly displayed significantly improved knockdown values. The immediate reduction in foam height (i.e. knockdown) is a characterictic that is critical to an antifoam composition to be used in pulp mill liquor processing operations.

EXAMPLES 48–53

Shake Test Method

This method gives a relative measure of defoaming performance. A measured amount of sample is added to a solution of Triton® X-100 (octylphenoxypolyethoxy(10)ethanol having an HLB value of 13.5 from Rohm and Haas, Philadelphia, Pa.). The mixture is shaken in a wrist action shaker and the time in seconds required for the foam to collapse and break are both recorded. Collapse occurs when the foam height has fallen to 0.5 cm or below over the majority of the surface. Break occurs when the clear smooth surface of the solution shows through the collapsed foam. The size of the break is generally not critical since once the breaking starts the clear area expands rapidly. The 100% active defoamers are diluted in propylene glycol and antifoam emulsions are diluted with water prior to testing. Examples 48 and 51 hereinbelow were 100%. active defoamers and were tested by diluting 0.25 g of the emulsion in 49.75 g of propylene glycol. Then 1 g of the dilution was mixed with 100 ml of a 1% Triton® X-100 solution and this mixture was placed in the shaker. The remaining Examples were tested by diluting 0.3 g of the emulsion in 49.67 g of water and then following the procedure described hereinabove.

The following series of experiments were conducted to show the unexpected improvement in performance of the compositions of the present invention when a hydroxyl-endblocked polydiorganosiloxane polymer (IV) is added to the compositions of the present invention (Components (I) and (II)).

Concentrate I was a mixture of 30 parts of Fluid A, 15 parts of either a trimethylsilyl endblocked polydimethylsiloxane having a viscosity of about 20 centistokes at 25° C. (Polyorganosiloxane I) or a hydroxyl-endblocked polyorganosiloxane polymer (Polydiorganosiloxane II) having a viscosity of about 38–45 centistokes at 25° C. and 55 parts of a silicone glycol copolymer having the average structure:

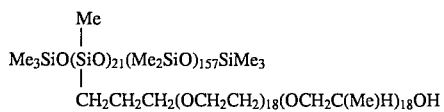

Comparative Example 48 was Concentrate I described hereinabove and contained Polyorganosiloxane I.

Comparative Example 49 was a mixture of 60 grams (g) of a solution containing 0.15 weight percent of Carbopol® 941 (Polyacrylic Acid from BF Goodrich Specialty Polymers & Chemicals Division, Brecksville, Ohio), 0.25 weight percent of 25% sodium hydroxide solution, 0.20 weight percent of Kathon® LX (a 1.5% biocide solution from Rohm and Haas, Philadelphia, Pa.), and 99.4 weight percent of water, 1.25 g of Triton® X-100, 1.85 g of Triton® X-35 (octylphenoxy polyethoxy ethanol having an HLB value of 7.8 from Rohm and Haas, Philadelphia, Pa.), to which was added 33.3 g of Concentrate I containing Polyorganosiloxane I.

Comparative Example 50 was a mixture of 194.30 grams (g) of a solution containing 0.4 weight percent of Keltrol® (Xantham Gum from Kelco, Div. of Merck & Co., Inc. San Diego, Calif.), 0.20 weight percent of Kathon® LX, and 99.4 weight percent of water, 3.75 g of Triton® X-100, 1.85 g of Triton® X-35 to which was added 100 g of Concentrate I containing Polyorganosiloxane I.

Example 51 was Concentrate I described hereinabove and contained Polyorganosiloxane II.

Example 52 was a mixture of 60 grams (g) of a solution containing 0.15 weight percent of Carbopol® 941, 0.25 weight percent of 25% sodium hydroxide solution, 0.20 weight percent of Kathon® LX, and 99.4 weight percent of water, 1.25 g of Triton® X-100, 0.63 g of Triton® X-35, to which was added 33.3 g of Concentrate I containing Polyorganosiloxane II.

Example 53 was a mixture of 194.30 grams (g) of a solution containing 0.4 weight percent of Keltrol®, 0.20 weight percent of Kathon® LX, and 99.4 weight percent of water, 3.75 g of Triton® X-100, 1.85 g of Triton® X-35 to which was added 100 g of Concentrate I containing Polyorganosiloxane II.

These Examples were then tested for Collapse and Break times according to the Shake Test method described hereinabove and the results are reported in Table 14 hereinbelow.

TABLE 14

| Example | Shake Time (sec) | Collapse Time (sec) | Break Time (sec) |
|---|---|---|---|
| 48 | 10 | 55 | 120+ |
|  | 40 | 80 | 120+ |
|  | 60 | 91 | 120+ |
|  | 120 | 72 | 120+ |
| 49 | 10 | 43 | 120+ |
|  | 40 | 95 | 120+ |
|  | 60 | 104 | 120+ |
|  | 120 | 120+ | 120+ |
| 50 | 10 | 120+ | 120+ |

TABLE 14-continued

| Example | Shake Time (sec) | Collapse Time (sec) | Break Time (sec) |
|---|---|---|---|
|  | 40 | 120+ | 120+ |
|  | 60 | 120+ | 120+ |
|  | 120 | 120+ | 120+ |
| 51 | 10 | 5 | 8 |
|  | 40 | 12 | 16 |
|  | 60 | 15 | 18 |
|  | 120 | 18 | 22 |
| 52 | 10 | 4 | 5 |
|  | 40 | 9 | 12 |
|  | 60 | 11 | 14 |
|  | 120 | 14 | 18 |
| 53 | 10 | 8 | 11 |
|  | 40 | 14 | 17 |
|  | 60 | 16 | 20 |
|  | 120 | 17 | 20 |

Table 14 shows that the collapse and break times for the antifoam compositions of the present invention were greatly reduced in comparison to compositions which do not contain a hydroxyl-endblocked polydiorganosiloxane. It is also readily apparent that the preferred compositions of the present invention require far fewer components than compositions which do not contain the hydroxyl endblocked polydiorganosiloxane (see Example 51 which only contains Fluid A, a hydroxyl endblocked polydiorganosiloxane, and a silicone glycol copolymer).

EXAMPLES 54–56

A mixture was prepared by mixing 100 g of Fluid A and 50 g of either a trimethylsilyl endblocked polydimethylsiloxane having a viscosity of about 500 centistokes at 25° C. (Polyorganosiloxane I), a trimethylsilyl endblocked polydimethylsiloxane having a viscosity of about 35 centistokes at 25° C. (Polyorganosiloxane II) or a hydroxyl-endblocked polydimethylsiloxane polymer (Polyorganosiloxane III) having a viscosity of from 38–45 centistokes at 25° C. to form mixture (a). Concurrently, 309 g of P 4000 (a polypropylene glycol of about 4000 molecular weight from Dow Chemical Company (Midland, Mich.) were mixed with 15 g of a nonionic silicone surfactant of trimethylsilyl endcapped polysilicate prepared according to methods described by Keil in U.S. Pat. No. 3,784,479, to form mixture (b). The two mixtures (a and b) were then blended together, and an additional 7.5 g of the nonionic silicone surfactant were added to the resulting mixture and stirred.

A third mixture (c) was then prepared by adding 10 g of Pluronic® L-64 (a block copolymer of propylene oxide and ethylene oxide having an HLB of from 12–18 from BASF, Parsippany, N.J.), 5 g of Pluronic® L-92 (a block copolymer of propylene oxide and ethylene oxide having an HLB of from 1–7 from BASF, Parsippany, N.J.), 2.4 g of Iconol™ TDA-10 (an ethoxylated alcohol (tridecyl alcohol) having an HLB of 14 from BASF, Parsippany, N.J.), and 0.8 g of Kathon® LX to 395 g of water. To this mixture was added 1.6 g of Keltrol®.

Next, 385.89 g of the mixture above containing (a) and (b) was added to mixture (c) and this produced an emulsion (Concentrate I) having a non-volatile content of 50% (including organic surfactants). This mixture was then subjected to the Shake Test described hereinabove, using the three different Polyorganosiloxanes described hereinabove and this data is reported in Table 15 below.

Example 54 is Concentrate I containing Polyorganosiloxane I.

Example 55 is Concentrate I containing Polyorganosiloxane II.

Example 56 is Concentrate I containing Polyorganosiloxane III.

TABLE 15

| Example | Shake Time (sec) | Collapse Time (sec) | Break Time (sec) |
|---|---|---|---|
| 54 | 10 | 12 | 16 |
|  | 40 | 23 | 29 |
|  | 60 | 26 | 33 |
|  | 120 | 31 | 39 |
| 55 | 10 | 16 | 20 |
|  | 40 | 46 | 59 |
|  | 60 | 65 | 120 |
|  | 120 | 71 | 120 |
| 56 | 10 | 6 | 10 |
|  | 40 | 13 | 20 |
|  | 60 | 21 | 27 |
|  | 120 | 27 | 34 |

Table 15 shows that the collapse and break times for antifoam compositions containing hydroxyl endblocked polydiorganosiloxanes were greatly reduced in comparison to the compositions which contain trimethylsilyl endblocked polydiorganosiloxane.

It should be clearly understood that the forms of the invention described herein are exemplary only and are not intended as limitations on the scope of the present invention as defined in the appended claims.

That which is claimed is:

1. A composition prepared by mixing at room temperature:
(I) a reaction product prepared by reacting at a temperature of 50° C. to 300° C.:
   (i) 100 parts by weight of at least one polyorganosiloxane selected from the group consisting of
      (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and
      (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain;
   (ii) 0.5 to 20 parts by weight of at least one silicon compound selected from the group consisting of
      (a) an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less,
      (b) a partially hydrolyzed condensate of said compound (a),
      (c) a siloxane resin consisting essentially of $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, and
      (d) a condensate of said compound (c) with said compound (a) or (b);
   (iii) greater than zero to 30 parts by weight of at least one finely divided filler; and
   (iv) a catalytic amount of an equilibration catalyst for promoting the reaction of components (i) to (iii), said catalyst being selected from the group consisting of alkali metal hydroxides, alkali metal silanolates, alkali metal alkoxides, quaternary ammonium hydroxides, and quaternary ammonium silanolates;
(II) from about 20 to 200 parts by weight for each 100 parts by weight of said reaction product (I) of a silicone-glycol copolymer having the average general formula $$QR^1_2SiO(R^1SiO)_j(R^1_2SiO)_kSiR^1_2Q$$
$$|$$
$$G$$

wherein $R^1$ has been previously defined, Q is $R^1$ or G, j has a value of 1 to 25, k has a value of 0 to 200, and G is a polyoxyalkylene group having the average structure $$-R(OCH_2CH_2)_m(OCH_2CH)_nOZ$$
$$|$$
$$CH_3$$

in which R is a divalent hydrocarbon group having 2 to 20 carbon atoms, m has a value of about 7 to 24, n has a value of 0 to about 24 and Z is selected from the group consisting of hydrogen, an alkyl radical having 1 to 6 carbon atoms and an acyl group having 2 to 6 carbon atoms; and from 10 to 100 parts by weight for each 100 parts by weight of said reaction product (I) of a hydroxyl-endblocked polydiorganosiloxane polymer having the formula:

$$\begin{array}{cc} R & R \\ | & | \\ HO-SiO-(R_2SiO)_x-Si-OH \\ | & | \\ R & R \end{array}$$

wherein R is a monovalent hydrocarbon radical or monovalent halohydrocarbon radical free of aliphatic unsaturation having from 1 to 20 carbon atoms and x has a value from 5 to 100.

2. A composition prepared by mixing at room temperature:
(I) a reaction product prepared by reacting at a temperature of 50° C. to 300° C.:
   (i) 100 parts by weight of at least one polyorganosiloxane selected from the group consisting of
      (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and
      (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain;
   (ii) 0.5 to 20 parts by weight of at least one silicon compound selected from the group consisting of (a) an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less, (b) a partially hydrolyzed condensate of said compound (a), (c) a siloxane resin consisting essentially of $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, and (d) a condensate of said compound (c) with said compound (a) or (b); and (iii) a catalytic amount of an equilibration catalyst for promoting the reaction of components (i) to (iii), said catalyst being selected from the group consisting of alkali metal hydroxides, alkali metal silanolates, alkali metal alkoxides, quaternary ammonium hydroxides, and quaternary ammonium silanolates;

(II) from about 20 to 200 parts by weight for each 100 parts by weight of said reaction product (I) of a silicone-glycol copolymer having the average general formula

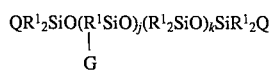

wherein $R^1$ has been previously defined, Q is $R^1$ or G, j has a value of 1 to 25, k has a value of 0 to 200, and G is a polyoxyalkylene group having the average structure

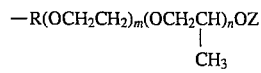

in which R is a divalent hydrocarbon group having 2 to 20 carbon atoms, m has a value of about 7 to 24, n has a value of 0 to about 24 and Z is selected from the group consisting of hydrogen, an alkyl radical having 1 to 6 carbon atoms and an acyl group having 2 to 6 carbon atoms; and from 10 to 100 parts by weight for each 100 parts by weight of said reaction product (I) of a hydroxyl-endblocked polydiorganosiloxane polymer having the formula:

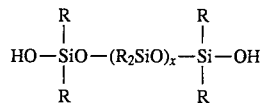

wherein R is a monovalent hydrocarbon radical or monovalent halohydrocarbon radical free of aliphatic unsaturation having from 1 to 20 carbon atoms and x has a value from 5 to 100.

3. The composition according to claim 1, wherein j is 1 to about 20, k is 0 to about 100, and said resinous silicon compound (ii) is selected from the group consisting of said partially hydrolyzed condensate (b), said siloxane resin (c) and said condensate (d).

4. The composition according to claim 3, wherein said silicone defoamer reaction product (I) further consists essentially of up to 20 parts by weight of:

(v) a polyorganosiloxane having a viscosity of 5 to 200 cS at 25° C. and being expressed by the general formula $R^6_e(R^9O)_f SiO_{(4-e-f)/2}$ in which $R^6$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 and f has a sufficiently large value to give at least two $-OR^9$ groups in each molecule at the end of a molecular chain.

5. The composition according to claim 4, wherein said polyorganosiloxane (A) is a trimethylsiloxy-terminated polydimethylsiloxane having a viscosity of about 350 to 15,000 cS at 25° C., said polyorganosiloxane (B) is a hydroxyl-terminated polydimethylsiloxane having a viscosity of about 1,000 to 50,000 cS at 25° C., said polyorganosiloxane (v) is a hydroxyl-terminated polydimethylsiloxane having a viscosity of about 10 to 50 cS at 25° C. and wherein $R^1$ is a methyl radical.

6. The composition according to claim 5, further consisting essentially of from about 1 to 15 parts by weight for each 100 parts by weight of said silicone defoamer reaction product (I) of:

(III) a finely divided filler.

7. The composition according to claim 6, wherein said finely divided filler (iii) and said finely divided filler (III) are each silica and said resinous silicon compound (ii) is selected from the group consisting of alkyl polysilicates in which the alkyl group has 1 to 5 carbon atoms and said siloxane resin (c).

8. The composition according to claim 5, wherein said resinous silicon compound (ii) is selected from the group consisting of alkyl polysilicates in which the alkyl group has 1 to 5 carbon atoms and said siloxane resin (c).

9. The composition according to claim 1, further consisting essentially of from about 10 to 100 parts by weight for each 100 parts by weight of said silicone defoamer reaction product (I) of:

(IV) at least one polyorganosiloxane selected from the group consisting of a trimethylsilyl-terminated polydimethylsiloxane having a viscosity of about 2 to 100 cS at 25° C. and a trimethylsiloxy-terminated polydimethylsiloxane having a viscosity of about 150 to 100,000 cS at 25° C.

10. The composition according to claim 5, further consisting essentially of from about 10 to 100 parts by weight for each 100 parts by weight of said silicone defoamer reaction product (I) of:

(IV) at least one polyorganosiloxane selected from the group consisting of a trimethylsilyl-terminated polydimethylsiloxane having a viscosity of about 2 to 100 cS at 25° C. and a trimethylsiloxy-terminated polydimethylsiloxane having a viscosity of about 150 to 100,000 cS at 25° C.

11. The composition according to claim 6, further consisting essentially of from about 10 to 100 parts by weight for each 100 parts by weight of said silicone defoamer reaction product (I) of:

(IV) at least one polyorganosiloxane selected from the group consisting of a trimethylsilyl-terminated polydimethylsiloxane having a viscosity of about 2 to 100 cS at 25° C. and a trimethylsiloxy-terminated polydimethylsiloxane having a viscosity of about 150 to 100,000 cS at 25° C.

12. The composition according to claim 1, wherein x has a value of from 10 to 60.

13. The composition according to claim 3, wherein said polyorganosiloxane (A) is a trimethylsiloxy-terminated polydimethylsiloxane having a viscosity of about 350 to 15,000 cS at 25° C., said polyorganosiloxane (B) is a hydroxyl-terminated polydimethylsiloxane having a viscosity of about 1,000 to 50,000 cS at 25° C. and wherein $R^1$ is a methyl radical.

14. The composition according to claim 13, further consisting essentially of from about 1 to 15 parts by weight for each 100 parts by weight of said silicone defoamer reaction product (I) of:

(III) a finely divided filler.

15. The composition according to claim 14, wherein said finely divided filler (iii) and said finely divided filler (III) are each silica and said resinous silicon compound (ii) is selected from the group consisting of alkyl polysilicates in which the alkyl group has 1 to 5 carbon atoms and said siloxane resin (c).

16. The composition according to claim 15, wherein said silicone glycol (II) has the formula

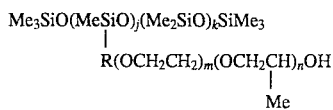

wherein Me denotes a methyl radical, R is selected from the group consisting of trimethylene and isobutylene, j has a value of 1 to 10, k has a value of 0 to 100, m is 7 to 12, n is less than or equal to m, and wherein said resinous silicon compound (ii) is selected from the group consisting of ethyl polysilicate and a siloxane resin copolymer consisting essentially of $(CH_3)_3SiO_{1/2}$ units and $SiO_2$ units in a molar ratio of approximately 0.75:1.

17. The composition according to claim 13, wherein said resinous silicon compound (ii) is selected from the group consisting of alkyl polysilicates in which the alkyl group has 1 to 5 carbon atoms and said siloxane resin (c), and said filler (iii) is silica.

18. In a process of controlling foam in an aqueous foaming system which includes the addition of a foam control agent to said system, the improvement comprising using as the foam control agent the composition of claim 1.

19. In a process of controlling foam in an aqueous foaming system which includes the addition of a foam control agent to said system, the improvement comprising using as the foam control agent the composition of claim 3.

20. In a process of controlling foam in an aqueous foaming system which includes the addition of a foam control agent to said system, the improvement comprising using as the foam control agent the composition of claim 4.

21. In a process of controlling foam in an aqueous foaming system which includes the addition of a foam control agent to said system, the improvement comprising using as the foam control agent the composition of claim 6.

22. In a process of controlling foam in an aqueous foaming system which includes the addition of a foam control agent to said system, the improvement comprising using as the foam control agent the composition of claim 9.

23. In a process of controlling foam in an aqueous foaming system which includes the addition of a foam control agent to said system, the improvement comprising using as the foam control agent the composition of claim 10.

24. In a process of controlling foam in an aqueous foaming system which includes the addition of a foam control agent to said system, the improvement comprising using as the foam control agent the composition of claim 11.

25. In a process of controlling foam in an aqueous foaming system which includes the addition of a foam control agent to said system, the improvement comprising using as the foam control agent the composition of claim 13.

26. In a process of controlling foam in an aqueous foaming system which includes the addition of a foam control agent to said system, the improvement comprising using as the foam control agent the composition of claim 16.

27. In a process of controlling foam in an aqueous foaming system which includes the addition of a foam control agent to said system, the improvement comprising using as the foam control agent the composition of claim 17.

28. The process of claim 18, wherein said aqueous foaming system has a pH greater than about 12.

29. The process of claim 19, wherein said aqueous foaming system has a pH greater than about 12.

30. The process of claim 28, wherein said aqueous foaming system is a kraft process black liquor.

31. The process of claim 29, wherein said aqueous foaming system is a kraft process black liquor.

32. The process of claim 18, wherein said aqueous foaming system has a pH less than about 3.

33. The process of claim 19, wherein said aqueous foaming system has a pH less than about 3.

34. The process of claim 20, wherein said aqueous foaming system has a pH greater than about 12.

35. The process of claim 21, wherein said aqueous foaming system has a pH greater than about 12.

36. The process of claim 18, wherein said aqueous foaming system is selected from the group consisting of phosphoric acid and sulphite process pulping media.

37. The process of claim 19, wherein said aqueous foaming system is selected from the group consisting of phosphoric acid and sulphite process pulping media.

38. The process of claim 18, wherein said aqueous foaming system is a bauxite digestion medium.

* * * * *